(12) United States Patent
Tieu et al.

(10) Patent No.: US 9,870,456 B2
(45) Date of Patent: Jan. 16, 2018

(54) SYSTEMS AND METHODS FOR BIOMETRIC AUTHENTICATION

(71) Applicant: Synaptics Inc., San Jose, CA (US)

(72) Inventors: Kinh Tieu, Sunnyvale, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 26 days.

(21) Appl. No.: 14/673,838

(22) Filed: Mar. 30, 2015

(65) Prior Publication Data
US 2016/0292407 A1 Oct. 6, 2016

(51) Int. Cl.
*G06F 21/32* (2013.01)
*G06K 9/00* (2006.01)
*G10L 15/00* (2013.01)

(52) U.S. Cl.
CPC ............ *G06F 21/32* (2013.01); *G06K 9/00* (2013.01)

(58) Field of Classification Search
CPC .................................................. G05B 19/00
USPC ........................................................ 340/5.82
See application file for complete search history.

(56) References Cited

U.S. PATENT DOCUMENTS

| | | | | |
|---|---|---|---|---|
| 6,160,903 A * | 12/2000 | Hamid | ............... | G07C 9/00158 382/115 |
| 7,545,962 B2 | 6/2009 | Peirce et al. | | |
| 8,923,576 B2 * | 12/2014 | Sayac | ............... | G06K 9/00114 283/68 |
| 2003/0179912 A1 * | 9/2003 | Murase | ............... | G06K 9/00154 382/119 |
| 2004/0083394 A1 | 4/2004 | Brebner et al. | | |
| 2008/0226146 A1 * | 9/2008 | Niklan | ............... | G06K 9/0012 382/128 |
| 2009/0232361 A1 * | 9/2009 | Miller | ............... | G06K 9/00892 382/115 |
| 2010/0100377 A1 * | 4/2010 | Madhavapeddi | ....... | G10L 15/22 704/235 |
| 2014/0016839 A1 * | 1/2014 | Uno | ............... | G06K 9/00087 382/125 |

(Continued)

*Primary Examiner* — Joseph Feild
*Assistant Examiner* — John Mortell
(74) *Attorney, Agent, or Firm* — Leydig, Voit & Mayer, Ltd.

(57) ABSTRACT

Systems and methods for authentication are disclosed. A method for biometric authentication, includes: receiving a first attempt to validate an identity using biometric information; determining if the first attempt satisfies a first authentication criterion for authentication, wherein the first authentication criterion corresponds to the first attempt; if the first attempt does not satisfy the first authentication criterion, subsequent to determining that the first attempt does not satisfy the first authentication criterion, receiving a subsequent attempt to validate the identity using biometric information, wherein a second authentication criterion corresponds to the subsequent attempt, and wherein the second authentication criterion has a lower false acceptance rate than the first authentication criterion; determining if the subsequent attempt satisfies the second authentication criterion; and if the subsequent attempt does satisfy the second authentication criterion, validating the identity in response to determining that the subsequent attempt does satisfy the second authentication criterion.

20 Claims, 4 Drawing Sheets

(56) References Cited

U.S. PATENT DOCUMENTS

| | | |
|---|---|---|
| 2014/0037151 A1 | 2/2014 | Benini |
| 2014/0157401 A1 | 6/2014 | Alameh et al. |
| 2015/0149361 A1* | 5/2015 | Lee .................. G06Q 20/40145 |
| | | 705/44 |
| 2016/0034744 A1* | 2/2016 | Chiang .............. G06K 9/00073 |
| | | 382/125 |
| 2016/0063235 A1* | 3/2016 | Tussy ...................... G06F 21/34 |
| | | 726/6 |

* cited by examiner

SYSTEMS AND METHODS FOR BIOMETRIC AUTHENTICATION

FIELD

This disclosure relates generally to the field of biometrics and, more specifically, to systems and methods for biometric authentication.

BACKGROUND

Since its inception, biometric sensing technology has revolutionized identification and authentication processes. The ability to capture and store biometric data in a digital file of minimal size has yielded immense benefits in fields such as law enforcement, forensics, and information security.

However, the widespread adoption of biometric sensing technology in a broad range of applications has faced a number of obstacles. When biometric sensing technology is used for authentication (for example, for unlocking a mobile device), the process is inherently noisy or imperfect. For example, if the biometric sensor is a fingerprint sensor, it is possible that another person (i.e., an "imposter") has a similar enough fingerprint to the fingerprint of the correct user so that the imposter is able to authenticate with his or her own fingerprint. This phenomenon is referred to as a "false acceptance." The rate at which false acceptance occurs for a given authentication scheme is referred to as the "false acceptance rate" (FAR).

Another problem with using electronic sensing technology for authentication is that sometimes the correct user is not able to authenticate. This may be caused by, for example, a poor quality image used for verification, a dirty or blemished finger, or simply poor placement on the sensor, among other reasons. The phenomenon of not authenticating the correct user is referred to as a "false rejection." The rate at which false rejection occurs for a given authentication scheme is referred to as the "false rejection rate" (FRR).

Accordingly, there remains a need in the art for a biometric authentication scheme that can minimize the "false rejection rate" (FRR) while maintaining a low "false acceptance rate" (FAR).

SUMMARY

One embodiment provides a device including a biometric sensor and a processing system. The processing system is configured to: receive, from the biometric sensor, data corresponding a first attempt to validate an identity of a user; determine if a score associated with the data corresponding to the first attempt satisfies a first authentication threshold for authentication, wherein the first authentication threshold corresponds to the first attempt; if the score associated with the data corresponding to the first attempt does not satisfy the first authentication threshold, subsequent to determining that the first attempt does not satisfy the first authentication threshold, receive, from the biometric sensor, data corresponding to a subsequent attempt to validate the identity of the user, wherein a second authentication threshold corresponds to the subsequent attempt, and wherein the second authentication threshold is higher than the first authentication threshold; determine if a score associated with the subsequent attempt satisfies the second authentication threshold; and if the score associated with the subsequent attempt does satisfy the second authentication threshold, validate the identity of the user in response to determining that the score associated with the subsequent attempt does satisfy the second authentication threshold Other embodiments provide a method and non-transitory computer-readable storage medium storing instructions that, when executed by a processor, causes a computing device to authenticate a user, by: receiving data corresponding a first attempt to validate an identity of the user using biometric information; determining if a score associated with the data corresponding to the first attempt satisfies a first authentication threshold for authentication, wherein the first authentication threshold corresponds to the first attempt; if the score associated with the data corresponding to the first attempt does not satisfy the first authentication threshold, subsequent to determining that the first attempt does not satisfy the first authentication threshold, receiving data corresponding to a subsequent attempt to validate the identity of the user using biometric information, wherein a second authentication threshold corresponds to the subsequent attempt, and wherein the second authentication threshold is higher than the first authentication threshold; determining if a score associated with the subsequent attempt satisfies the second authentication threshold; and if the score associated with the subsequent attempt does satisfy the second authentication threshold, validating the identity of the user in response to determining that the score associated with the second attempt does satisfy the second authentication threshold.

DETAILED DESCRIPTION

Figure 1:
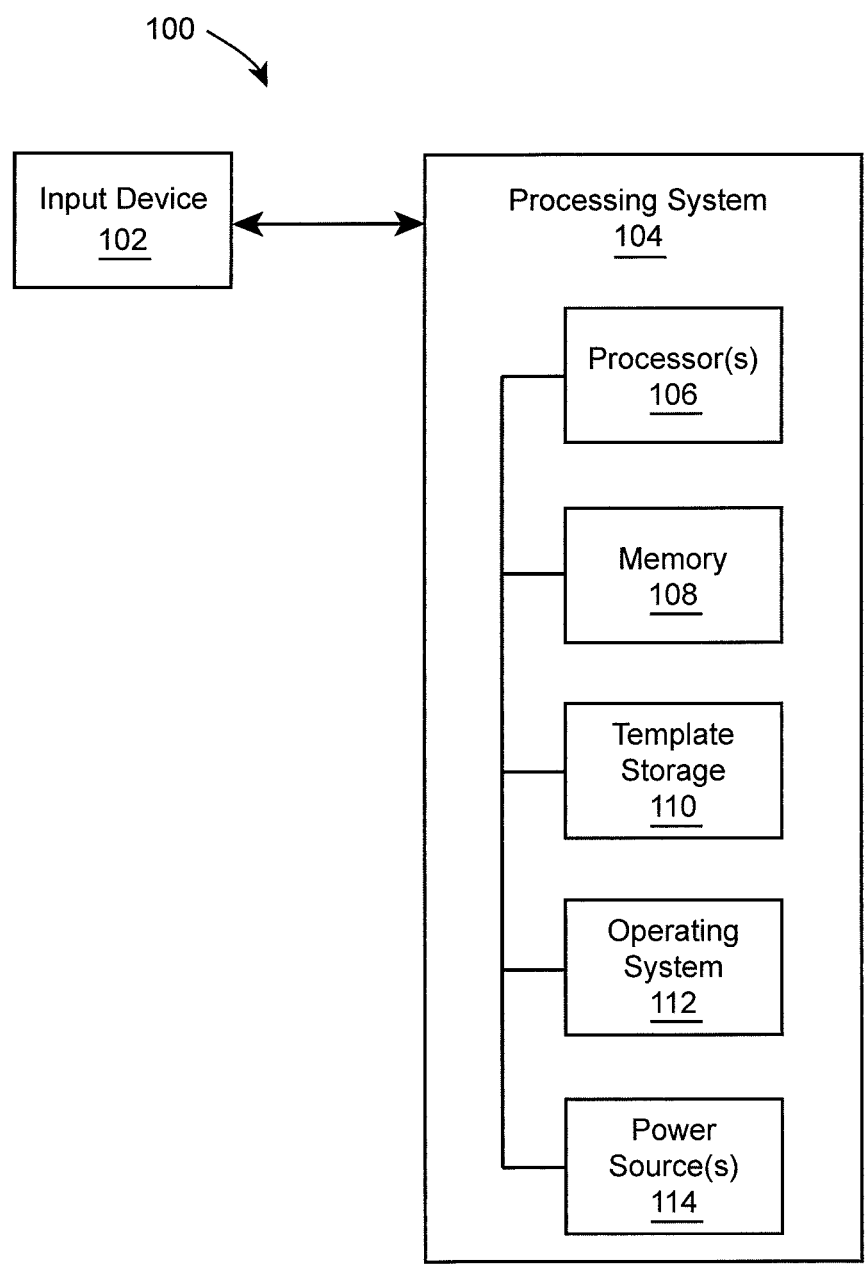
FIG. 1 is a block diagram of an example electronic system that includes an input device and a processing system, according to an embodiment of the disclosure.

Embodiments of the disclosure provide systems and methods that can minimize the "false rejection rate" (FRR) while maintaining a low "false acceptance rate" (FAR) in authentication techniques. Embodiments disclosed herein are applicable to any authentication scheme that does not require a perfect match to authenticate a user (e.g., a typical password scheme requires the entered password to match exactly the template password). Embodiments of the disclosure herein described can be used for fingerprint authentication, voice authentication, retina authentication, iris authentication, gesture-based authentication, a "lossy" password that does not need to be a perfect match to authenticate a user, among other authentication schemes.

In some typical authentication schemes, an authentication attempt is compared to an enrollment template and given a "score" corresponding to how closely the authentication attempt matches the template. If the score satisfies a threshold amount, the authentication attempt is deemed to be successful and authentication is achieved. If the score does not satisfy the threshold amount, the authentication attempt is unsuccessful and authentication is denied. In conventional approaches, the threshold required to achieve authentication is the same for each attempt.

In some embodiments, an industry standard for security of authentication schemes can set a false accept rate (FAR) to be on the order of 1 in 10,000 attempts to one in 1 in 100,000 attempts, preferably at least 1 in 50,000 attempts. The challenge is that in order to achieve a desired FAR (say, for example, 1 in 50,000 attempts) while still remaining below a certain FRR (say, for example, 2%), the sensing and matching process may need to be exceptionally accurate. In certain applications, the processing time needed to process an authentication attempt to achieve the desired FAR/FRR could take a long time and detract from the user experience. Furthermore, achieving the desired FAR/FRR may be hindered by the accuracy of the hardware used to capture the authentication features being matched (such as a capacitive fingerprint sensor). While the threshold for acceptance can be set lower to satisfy a given FRR, lowering the threshold for acceptance leads to an increase in the FAR, which may undesirably lower the security of the system. Similarly, the threshold for acceptance can be set higher in order to satisfy a given FAR, but increasing the threshold for acceptance leads to an increase in the FRR, which may undesirably detract from the user experience.

Embodiments of the disclosure resolve this dilemma by recognizing that in the real world the goal should be somewhat different than FAR on a single trial. Instead, embodiments of the disclosure describe authentication where the threshold for acceptance varies over a series of trials, so that the average acceptance over the trials achieves a desired FAR. In some embodiments, the acceptance threshold monotonically increases with each of the trials, so that the initial attempt has a relatively high probability of success for the true user, but the probability of false acceptance over the series of trials remains small.

In some embodiments, if the initial attempt fails for the true user, the true user is likely to be more careful on a subsequent attempt. Thus, even with an increased threshold for acceptance on the subsequent attempt, the FRR will probably decrease because the user likely will be more careful. For an imposter, in the example context of fingerprint authentication, it is irrelevant how carefully the imposter places his or her finger on the sensor. The FAR will continue to get less likely as the threshold for acceptance is increased.

In conventional systems where the threshold for acceptance is the same for every trial, in one example, the FAR requirement may be 1 in 50,000 attempts, or $2E^{-5}$. Let us assume that the imposter will attempt N trials.

If we assume an imposter will attempt N trials, then the probability of false acceptance over N trials is shown in Equation 1:

$$FAR_N = 1 - (1-FAR)^N \quad \text{(Equation 1)}.$$

For instance, if N=10 and the imposter tries 10 times, the imposter's chance of success become approximately 1 in 5,000.

According to embodiments of the disclosure, if we adopt an adaptive threshold strategy where on the $i^{th}$ attempt, the threshold is chosen to produce a false accept rate of $FAR_i$, then we can calculate the false accept rate over N trials as shown in Equation 2:

$$\overline{FAR}_N = 1 - \Pi_{i=1}^{N}(1-FAR_i) \quad \text{(Equation 2)}.$$

The goal is to choose the $FAR_i$ so that $\overline{FAR}_N = FAR_N$. Equating Equations 1 and 2 achieves Equation 3:

$$-(1-FAR)^N = \Pi_{i=1}^{N}(1-FAR_i) \quad \text{(Equation 3)}.$$

Taking the log and using the approximation $\log(1+x) \approx x$ for small x, Equation 3 becomes Equation 4:

$$N \cdot FAR = \Sigma_{i=1}^{N} FAR_i \quad \text{(Equation 4)}.$$

Now, suppose we enforce a rule of increasing thresholds such that:

$$FAR_i = r^{(i-1)} FAR_1 \text{ for } 0 < r < 1 \quad \text{(Equation 5)}.$$

Then, we can re-write Equation 4 as Equation 6:

$$N \cdot FAR = FAR_1 \sum_{i=1}^{N} r^{(i-1)} = FAR_1\left(\frac{1-r^N}{1-r}\right). \quad \text{(Equation 6)}$$

Thus, we should set $FAR_1$ as:

$$FAR_1 = N \cdot FAR\left(\frac{1-r}{1-r^N}\right), \quad \text{(Equation 7)}$$

and from Equation 5, obtain Equation 8:

$$FAR_i = N \cdot FAR\left(\frac{1-r}{1-r^N}\right)r^{(i-1)}. \quad \text{(Equation 8)}$$

Finally, the threshold for iteration i can be determined through simulation to achieve these $FAR_i$.

As a first example using actual values, suppose we wanted to achieve a FAR=1 in 50,000, over N=5 trials (equating to 1/10,000 overall FAR for those 5 attempts), where r=0.5. Examples values of $FAR_i$ over the 5 trials is shown in Table 1:

TABLE 1

| i | 1 | 2 | 3 | 4 | 5 |
|---|---|---|---|---|---|
| $FAR_i$ | 1/19375 | 1/38750 | 1/77500 | 1/155000 | 1/310000 |

Substituting these values for $FAR_i$ into Equation 2 verifies that the total FAR over N trials is 1/10K, which is also the result of Equation 1. Notice that because the first two $FAR_i$ numbers are less than 1/50K, the acceptance thresholds are lower. Therefore, the FRR is lower.

As a second example using actual values, suppose we wanted to achieve a FAR=1 in 25,000, over N=5 trials, where r=0.5. Examples values of $FAR_i$ over the 5 trials is shown in Table 2:

TABLE 2

| i | 1 | 2 | 3 | 4 | 5 |
|---|---|---|---|---|---|
| $FAR_i$ | 1/9688 | 1/19375 | 1/38750 | 1/77500 | 1/155000 |

Turning to the figures, FIG. 1 is a block diagram of an example electronic system 100 that includes an input device 102 (e.g., a sensor) and a processing system 104, according to an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the input device 102.

Input device 102 can be implemented as a physical part of the electronic device 100 or can be physically separate from the electronic device 100. In various embodiments, the input device 102 may communicate with parts of the electronic device 100 using any one or more of the following: buses, networks, and other wired or wireless interconnections. Examples include I²C, SPI, PS/2, Universal Serial Bus (USB), Bluetooth®, RF, and IRDA.

According to various embodiments, input device 102 is a biometric sensor that utilizes one or more various electronic sensing methods, techniques and devices to capture an image of a biometric pattern of a user. For example, in certain embodiments the input device 102 is a fingerprint sensor that uses capacitive sensing, optical sensing, ultrasonic sensing, or another sensing technology to capture an image of a fingerprint. In other embodiments, the input device 102 is an iris scanner configured to capture an image of an iris pattern of a user, or a retina scanner configured to capture an image of a retina pattern of a user. In yet further embodiments, the input device 102 is a biometric sensor configured to capture some other biometric pattern of the user, such as a camera that captures an image of a face of a user for facial recognition.

In other embodiments, the input device 102 is not used to capture a biometric image. For example, in a "lossy" password authentication scheme, the input device 102 could be a keyboard input. As another example, the input device 102 could be a proximity sensor configured to capture a gesture attempt that is matched to a stored gesture for authentication, such as a touch pad or touch screen configured to capture a 2D gesture, or a structured illumination sensor or ultrasonic sensor configured to capture 3D user gestures.

Turning now to the processing system 104 of FIG. 1, basic functional components of the electronic device 100 utilized during capturing, storing, and validating an authentication attempt are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 are configured to implement functionality and/or process instructions for execution within electronic device 100 and the processing system 104. For example, processor 106 executes instructions stored in memory 108 or instructions stored on template storage 110 to determine whether an authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Figure 2:
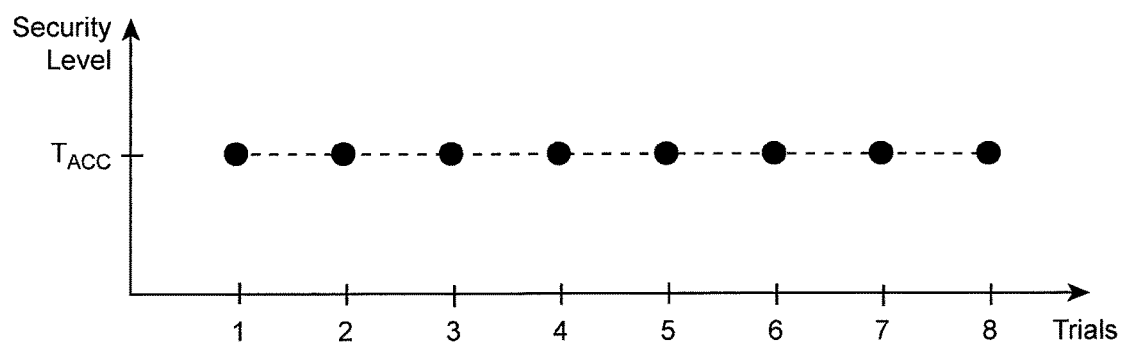
FIG. 2 is a chart illustrating a constant threshold for acceptance, according to one embodiment of the disclosure.

FIG. 2 is a chart illustrating a constant threshold for acceptance ($T_{ACC}$), according to one embodiment of the disclosure. Different trials are shown on the x-axis, with security level represented by the threshold for acceptance ($T_{ACC}$) shown on the y-axis. In FIG. 2, $T_{ACC}$ is the same for each trial.

Figure 3:
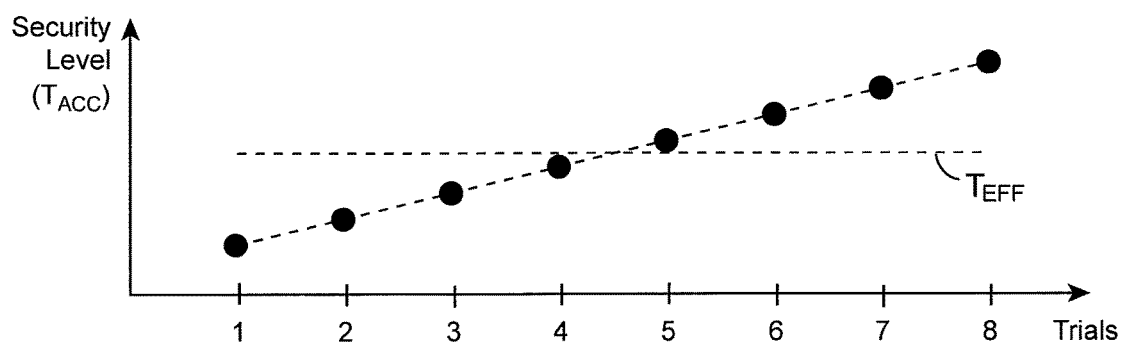
FIG. 3 is a chart illustrating a variable threshold for acceptance that varies according to a linear threshold schedule, according to one embodiment of the disclosure.

FIG. 3 is a chart illustrating a variable threshold for acceptance ($T_{ACC}$) that varies according to a linear threshold schedule, according to one embodiment of the disclosure. Different trials are shown on the x-axis, with security level represented by the threshold for acceptance ($T_{ACC}$) shown on the y-axis. As shown, $T_{ACC}$ changes for each trial over a series of N trials. In the example shown in FIG. 3, N=8. As shown, the threshold for acceptance ($T_{ACC}$) increases with each subsequent trial, making it more difficult for an authentication attempt to satisfy the threshold. The effective threshold for acceptance ($T_{EFF}$) over the series of N trials is also shown in FIG. 3. $T_{EFF}$ represents the effective acceptance threshold over the series of N trials. In some embodiments, $T_{EFF}$ is the mathematical average of the various thresholds in the series of N trials. In other embodiments, $T_{EFF}$ is not the mathematical average and is instead another value. As shown in FIG. 3, the threshold for acceptance ($T_{ACC}$) increases linearly. However, in other embodiments, the threshold for acceptance ($T_{ACC}$) can increase non-linearly, can decrease, or can vary in any pattern that is desired over the series of N trials. In some embodiments, the pattern that the threshold for acceptance ($T_{ACC}$) follows over a series of N trials is not material, as long a certain effective security level is achieved over the series of N trials.

Figure 4:
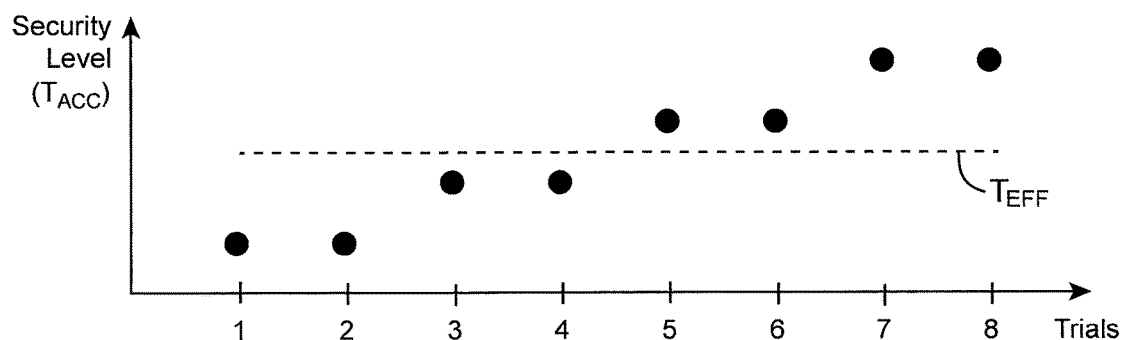
FIG. 4 is a chart illustrating a variable threshold for acceptance that varies according to a step-wise threshold schedule, according to one embodiment of the disclosure.

FIG. 4 is a chart illustrating a variable threshold for acceptance ($T_{ACC}$) that varies according to a step-wise threshold schedule, according to one embodiment of the disclosure. Different trials are shown on the x-axis, with security level represented by the threshold for acceptance ($T_{ACC}$) shown on the y-axis. In the example shown in FIG. 4, N=8. As shown, $T_{ACC}$ changes over the series of N trials, where $T_{ACC}$ is the same for two consecutive trials, then is increased for the next two trials, and so on. The effective threshold for acceptance ($T_{EFF}$) over the series of N trials is also shown in FIG. 4. $T_{EFF}$ represents the effective acceptance threshold over the series of N trials.

Figure 5:
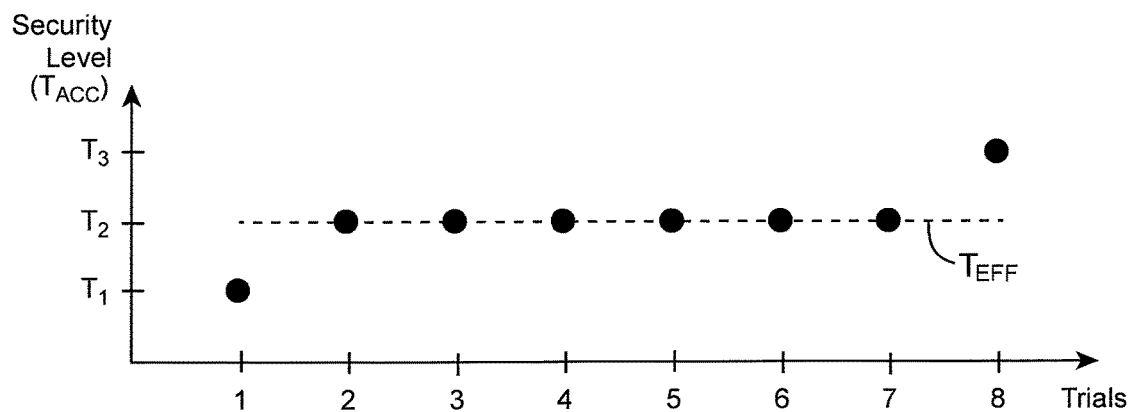
FIG. 5 is a chart illustrating a variable threshold for acceptance, according to one embodiment of the disclosure.

FIG. 5 is a chart illustrating a variable threshold for acceptance ($T_{ACC}$), according to one embodiment of the disclosure. Different trials are shown on the x-axis, with security level represented by the threshold for acceptance ($T_{ACC}$) shown on the y-axis. In the example shown in FIG. 5, N=8. As shown, the threshold for acceptance ($T_{ACC}$) for Trial 1 is $T_1$. On the next trial (i.e., Trial 2), the threshold for acceptance $T_{ACC}$ is increased to $T_2$. The threshold for acceptance remains at $T_2$ for six trials (i.e., through Trial 7). On Trial 8, the threshold for acceptance $T_{ACC}$ is increased to $T_3$. The effective threshold for acceptance ($T_{EFF}$) over the series of N trials is also shown in FIG. 5. $T_{EFF}$ represents the effective acceptance threshold over the series of N trials. In this example, $T_{EFF}=T_{AVG}=T_2$.

Figure 6:
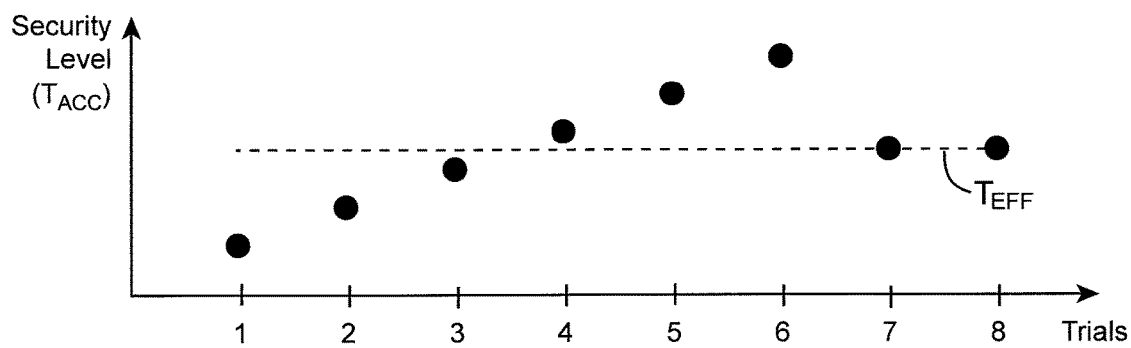
FIG. 6 is a chart illustrating a pattern for a variable threshold for acceptance, according to one embodiment of the disclosure.

FIG. 6 is a chart illustrating a pattern for a variable threshold for acceptance ($T_{ACC}$), according to one embodiment of the disclosure. Different trials are shown on the x-axis, with security level represented by the threshold for acceptance ($T_{ACC}$) shown on the y-axis. In the example shown in FIG. 6, N=8. As shown, $T_{ACC}$ increases linearly for Trial 1 to Trial 6. At Trial 7, $T_{ACC}$ decreases and remains constant for Trials 7-8. The effective threshold for acceptance ($T_{EFF}$) over the series of N trials is also shown in FIG. 6. $T_{EFF}$ represents the effective acceptance threshold over the series of N trials.

Figure 7:
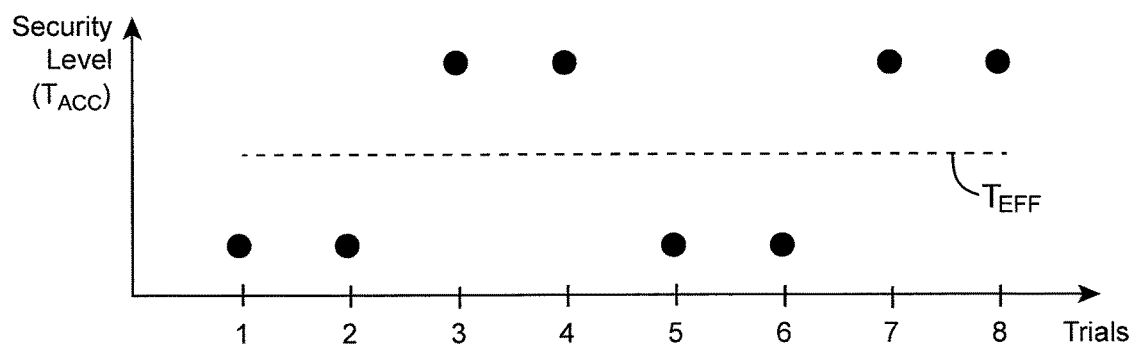
FIG. 7 is a chart illustrating an alternating pattern for a variable threshold for acceptance, according to one embodiment of the disclosure.

FIG. 7 is a chart illustrating an alternating pattern for a variable threshold for acceptance ($T_{ACC}$), according to one embodiment of the disclosure. Different trials are shown on the x-axis, with security level represented by the threshold for acceptance ($T_{ACC}$) shown on the y-axis. In the example shown in FIG. 7, N=8. As shown, $T_{ACC}$ for Trials 1-2 and 4-5 is set as $T_1$. $T_{ACC}$ for Trials 3-4 and 7-8 is set as $T_2$. The effective threshold for acceptance ($T_{EFF}$) over the series of N trials is also shown in FIG. 7. $T_{EFF}$ represents the effective acceptance threshold over a series of N trials.

FIGS. 3-7 show example threshold schedules for varying the threshold for acceptance ($T_{ACC}$). These examples are merely illustrative of a handful of patterns and other threshold schedules are also within the scope of embodiments of the disclosure. For example, other threshold schedules for varying the threshold for acceptance ($T_{ACC}$) can be parabolic, asymptotic, non-linear, linear, partially linear, exponential, or may have any pattern.

In some embodiments, the earlier trials in the series of N trials have a lower threshold for acceptance ($T_{ACC}$) than the trials near the end of the series of N trials. For example, in the examples of FIGS. 3, 4, and 5, the threshold ($T_{ACC}$) increases according to a monotonically increasing threshold schedule. By having the earlier trials be associated with a lower threshold for acceptance ($T_{ACC}$), the false rejection rate (FRR) of the true user is lowered for the earlier trials; yet, over the series of N trials, the average threshold for acceptance ($T_{AVG}$) is still sufficiently high to achieve a desired false acceptance rate (FAR), for example, 1 in 50,000 attempts.

Figure 8:
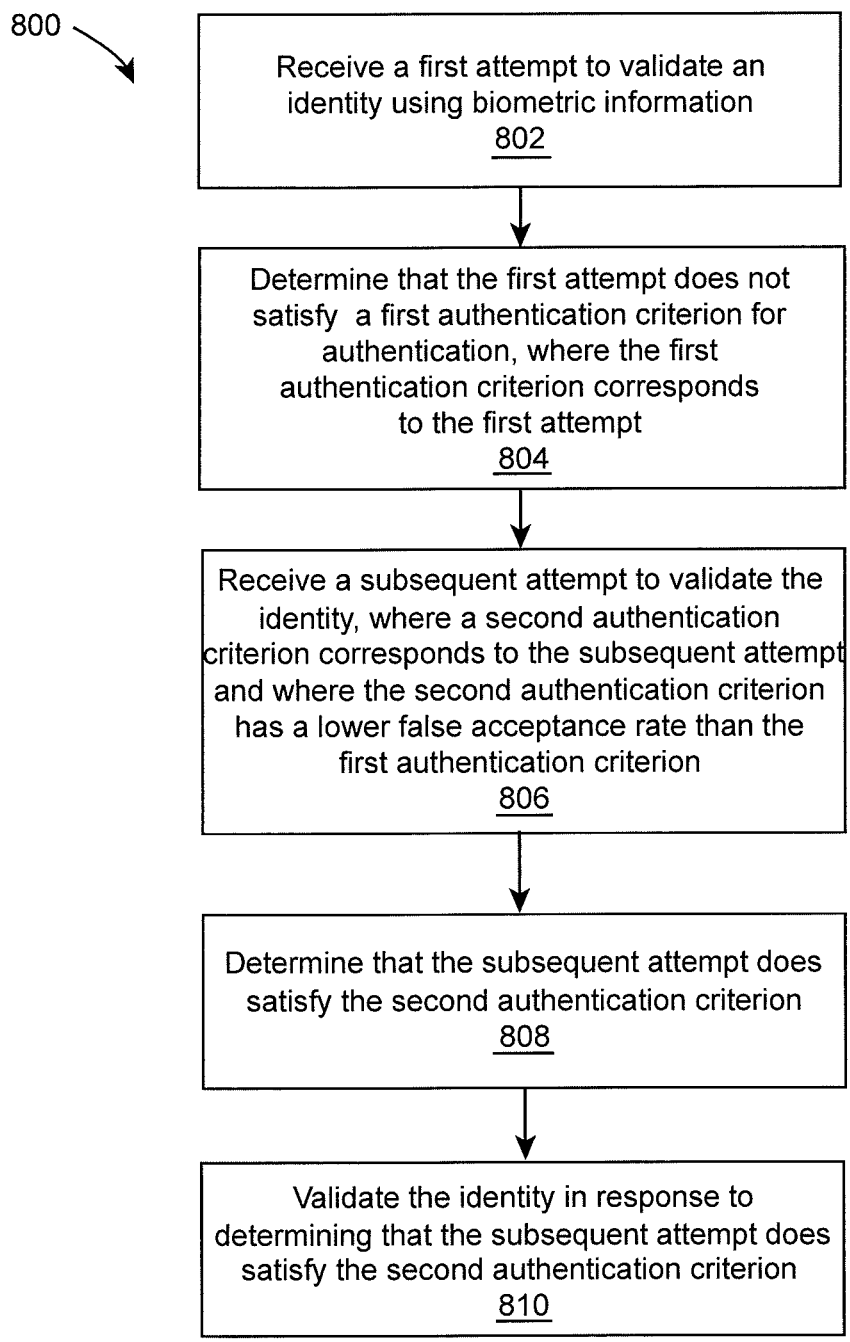
FIG. 8 is a flow diagram of method steps for authenticating a user, according to one embodiment of the disclosure.

FIG. 8 is a flow diagram of method steps for authenticating a user, according to one embodiment of the disclosure. As shown, the method 800 begins at step 802, where a processing system receives a first attempt to validate an identity using biometric information. In some instances, the "first" attempt is the initial attempt in a series of attempts to authenticate; whereas, in other instances, the label "first" can be used for any attempt and is not necessarily the initial attempt. In one implementation, the processing system comprises processing system 104 in FIG. 1. Although the method 800 is described in the context of biometric authentication (for example, fingerprint authentication) other embodiments may not involve biometrics and can be used in any authentication scheme in which authentication can be successful even if the authentication attempt does not perfectly match a template.

At step 804, the processing system determines that the first attempt does not satisfy a first authentication criterion for authentication, where the first authentication criterion corresponds to the first attempt. For example, each of the authentication attempts may be assigned a score representing how closely the authentication attempt matches to a template. If the score satisfies a threshold, then the authentication attempt is successful. If the score does not satisfy the threshold, then the authentication attempt is not successful.

At step 806, the processing system receives a subsequent attempt to validate the identity using biometric information, where a second authentication criterion corresponds to the subsequent attempt, and where the second authentication criterion has a lower false acceptance rate than the first authentication criterion. As described herein, the authentication criterion (or criteria) can vary from trial-to-trial. For example, the threshold for authentication can be increased for the subsequent attempt relative to the first attempt. Increasing the threshold for authentication corresponds to lowering the false acceptance rate (FAR), since less imposters are likely to be authenticated after the threshold for authentication is increased.

At step 808, the processing system determines that the subsequent attempt does satisfy the second authentication criterion. At step 810, the processing system validates the identity in response to determining that the subsequent attempt does satisfy the second authentication criterion. In one embodiment, validating the identity comprises unlocking a computing device, such as a mobile device.

In the example shown in FIG. 8, the user is validated on the subsequent attempt, which may be for example the very next attempt after the first attempt. However, as described in examples in FIGS. 3-7, a series of N trials can include variable thresholds for authentication at the first, second, third, or any number of subsequent attempts. In some embodiments, N should be greater than or equal to 2, preferably between 5 and 15. The value of N could be as high as 100 or higher. In some embodiments, the threshold for acceptance monotonically increases with each subsequent trial in the series of N trials. For example, the threshold for acceptance can increase for some trials while also remaining constant for two or more trials in the series of N trials, or the threshold for acceptance can increase with each subsequent trial in the series of N trials (see, e.g., FIG. 3). In other embodiments, the threshold for acceptance can remain constant for two or more trials, increase for some trials, or may decrease for some trials.

In some embodiments, the threshold for authentication is "reset" to the first authentication threshold in the series of trials after an amount of time has elapsed since a most recent authentication attempt. The amount of time can be configurable. The amount of time can be a fixed value (e.g., 30 minutes) or can decay over time.

In some embodiments, the threshold for authentication is "reset" to the first authentication threshold in the series of trials after validating the identity of the user. This way, the next time that the user attempts to authenticate, the process starts over with the first authentication threshold in the series of trials and, in some embodiments, can increase with each subsequent attempt in the series of trials.

In some embodiments, after a pre-determined number of attempts, the authentication procedure is failed and the user must authenticate through a different mode of authentication (for example, a password, recognition of a different type of biometric, etc.).

Advantageously, embodiments of the disclosure provide an authentication system and method that has a lower false reject rate relative to conventional approaches, yet still maintains a desired false acceptance rate. For example, by lowering the threshold of acceptance at the initial trials and increasing the threshold on subsequent trials, it is easier for the true user to authenticate during the initial trials. For an imposter, even if the imposter knows that the threshold for acceptance is lower on the initial trials and that the threshold will increase over time, there is still nothing that the imposter can do to "try harder" to authenticate. As such, embodiments of the disclosure provide for a large user experience improvement for the true user, without losing much or anything in terms of security relative to imposters.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device, comprising:
a biometric sensor; and
a processing system configured to:
    receive, from the biometric sensor, data corresponding a first attempt to validate an identity of a user, wherein the first attempt corresponds to the biometric sensor capturing a first biometric image of the user;
    determine that a score associated with the data corresponding to the first attempt does not satisfy a first authentication threshold for authentication, wherein the first authentication threshold corresponds to the first attempt;
    subsequent to determining that the first attempt does not satisfy the first authentication threshold, receive, from the biometric sensor, data corresponding to a second attempt to validate the identity of the user, wherein a second authentication threshold corresponds to the second attempt, wherein the second authentication threshold is higher than the first authentication threshold, wherein the second attempt corresponds to the biometric sensor capturing a second biometric image of the user, and wherein the second attempt is a next attempt at validating the identity of the user following the first attempt;
    determine whether a score associated with the second attempt satisfies the second authentication threshold; and
    if the score associated with the second attempt does satisfy the second authentication threshold, validate the identity of the user in response to determining that the score associated with the second attempt does satisfy the second authentication threshold.

2. The device of claim 1, wherein over a series of attempts to validate the identity of the user, each attempt in the series of attempts has a corresponding threshold for authentication according to a threshold schedule, wherein the threshold schedule over the series of attempts satisfies a security condition.

3. The device of claim 2, wherein the security condition comprises a false acceptance rate in a range of 1 in 10,000 attempts to 1 in 100,000 attempts.

4. The device of claim 2, wherein the series of attempts includes a number of attempts between 2 and 100.

5. The device of claim 2, wherein the threshold for authentication increases for each attempt in the series of attempts.

6. The device of claim 5, wherein the threshold for authentication increases linearly for each attempt in the series of attempts.

7. The device of claim 5, wherein the threshold for authentication increases non-linearly for each attempt in the series of attempts.

8. The device of claim 1, wherein over a series of attempts to validate the identity of the user, each attempt in the series of attempts has a corresponding threshold for authentication, wherein the corresponding thresholds for authentication monotonically increase over the series of attempts.

9. The device of claim 1, wherein validating the identity of the user comprises unlocking the device.

10. The device of claim 1, wherein the biometric sensor comprises a fingerprint sensor.

11. The device of claim 1, wherein the threshold for authentication is reset to the first authentication threshold after a first amount of time has elapsed.

12. The device of claim 1, wherein the threshold for authentication is reset to the first authentication threshold after validating the identity of the user.

13. A method for biometric authentication, comprising:
receiving a first attempt to validate an identity using biometric information, wherein the first attempt corresponds to a biometric sensor capturing a first biometric image of a user;
determining that the first attempt does not satisfy a first authentication criterion for authentication, wherein the first authentication criterion corresponds to the first attempt;
subsequent to determining that the first attempt does not satisfy the first authentication criterion, receiving a second attempt to validate the identity using biometric information, wherein a second authentication criterion corresponds to the second attempt, wherein the second authentication criterion has a lower false acceptance rate than the first authentication criterion, wherein the second attempt corresponds to the biometric sensor capturing a second biometric image of the user, and wherein the second attempt is a next attempt at validating the identity of the user following the first attempt;
determining whether the second attempt satisfies the second authentication criterion; and
if the second attempt does satisfy the second authentication criterion, validating the identity in response to determining that the second attempt does satisfy the second authentication criterion.

14. The method of claim 13,
wherein the first authentication criterion comprises a first threshold value, wherein the first authentication criterion is satisfied if a score associated with the first attempt is greater than or equal to the first threshold value; and
wherein the second authentication criterion comprises a second threshold value, wherein the second authentication criterion is satisfied if a score associated with the second attempt is greater than or equal to the second threshold value.

15. The method of claim 13, wherein over a series of attempts to validate the identity, attempt in the series of attempts has a corresponding authentication threshold according to a threshold schedule, wherein the threshold schedule over the series of attempts satisfies a security condition.

16. The method of claim 15, wherein the security condition comprises a false acceptance rate in a range of 1 in 10,000 attempts to 1 in 100,000 attempts.

17. The method of claim 13, further comprising:
after a pre-determined number of attempts to validate the identity using biometric information have failed to satisfy an authentication criterion, requiring the identity to be validated through a different mode of authentication.

18. A non-transitory computer-readable storage medium storing instructions that, when executed by a processor, causes a computing device to authenticate a user, by performing steps comprising:
receiving data corresponding a first attempt to validate an identity of the user using biometric information, wherein the first attempt corresponds to a biometric sensor capturing a first biometric image of the user;
determining that a score associated with the data corresponding to the first attempt does not satisfy a first authentication threshold for authentication, wherein the first authentication threshold corresponds to the first attempt;
subsequent to determining that the first attempt does not satisfy the first authentication threshold, receiving data corresponding to a second attempt to validate the identity of the user using biometric information, wherein a second authentication threshold corresponds to the second attempt, wherein the second authentication threshold is higher than the first authentication threshold, wherein the second attempt corresponds to the biometric sensor capturing a second biometric image of the user, and wherein the second attempt is a next attempt at validating the identity of the user following the first attempt;
determining whether a score associated with the second attempt satisfies the second authentication threshold; and
if the score associated with the second attempt does satisfy the second authentication threshold, validating the identity of the user in response to determining that the score associated with the second attempt does satisfy the second authentication threshold.

19. The non-transitory computer-readable storage medium of claim 18, wherein over a series of attempts to validate the identity of the user, each attempt in the series of attempts has a corresponding authentication threshold according to a threshold schedule, wherein the threshold schedule over the series of attempts satisfies a security condition.

20. The non-transitory computer-readable storage medium of claim 18, wherein the biometric information comprises fingerprint information, and wherein validating the identity of the user comprises unlocking the computing device.

* * * * *